US012746922B2

(12) United States Patent
Gelso et al.

(10) Patent No.: US 12,746,922 B2

(45) Date of Patent: Sep. 29, 2026

(54) VEHICLE STATUS EVALUATION

(71) Applicant: VOLVO TRUCK CORPORATION, Gothenburg (SE)

(72) Inventors: Esteban Gelso, Västra Frölunda (SE); Maliheh Sadeghi Kati, Partille (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/128,064

(22) PCT Filed: Nov. 15, 2022

(86) PCT No.: PCT/EP2022/081888
§ 371 (c)(1),
(2) Date: May 7, 2025

(87) PCT Pub. No.: WO2024/104562
PCT Pub. Date: May 23, 2024

(65) Prior Publication Data
US 2026/0200470 A1 Jul. 16, 2026

(51) Int. Cl.
*B60W 30/165* (2020.01)
*B60D 1/62* (2006.01)
*B60W 50/00* (2006.01)

(52) U.S. Cl.
CPC ............. *B60W 30/165* (2013.01); *B60D 1/62* (2013.01); *B60W 50/00* (2013.01);
(Continued)

(58) Field of Classification Search
CPC ............... B60W 30/165; B60W 50/00; B60W 2556/65; B60W 2520/14;
(Continued)

(56) References Cited

U.S. PATENT DOCUMENTS 10,363,909 B2 7/2019 Ripley et al.
11,364,885 B2 * 6/2022 Viele ..................... B60T 8/1708
(Continued)

FOREIGN PATENT DOCUMENTS

CN 112 447 040 A 3/2021
DE 10 2007 040165 A1 2/2009
(Continued)

OTHER PUBLICATIONS

International Search Report and Written Opinion for PCT Application No. PCT/EP2022/081888 dated Jul. 20, 2023, 12 pages.
(Continued)

*Primary Examiner* — Andrew Joseph Rudy
(74) *Attorney, Agent, or Firm* — Sage Patent Group

(57) ABSTRACT

A computer-implemented method for detection of order among vehicle units of a multi-unit combination vehicle. The method is for execution by a processor device of a computer system and comprises determining, by the processor device, at least two indications of order among the vehicle units, wherein the indications of order are determined by different procedures for detection of order among the vehicle units. The method also comprises providing, by the processor device, the detection of order among the vehicle units based on the at least two indications of order. Corresponding computer program product, non-transitory computer-readable storage medium, apparatus, control system, computer system, vehicle unit, and multi-unit combination vehicle are also disclosed.

18 Claims, 3 Drawing Sheets

(52) U.S. Cl.
CPC ............... *B60W 2050/0022* (2013.01); *B60W 2050/0031* (2013.01); *B60W 2520/105* (2013.01); *B60W 2520/125* (2013.01); *B60W 2520/14* (2013.01); *B60W 2556/65* (2020.02)

(58) Field of Classification Search
CPC ..... B60W 2050/022; B60W 2520/125; B60W 2520/105; B60W 2520/0031; B60D 1/62
USPC .......................................................... 701/193
See application file for complete search history.

(56) References Cited

U.S. PATENT DOCUMENTS

| | | | | |
|---|---|---|---|---|
| 11,425,548 | B2 | 8/2022 | Suda | |
| 12,570,290 | B2 * | 3/2026 | Ghandriz | B60W 20/12 |
| 12,612,042 | B2 * | 4/2026 | Stout, II | B60D 1/44 |
| 2009/0160679 | A1 | 6/2009 | Shackleton et al. | |
| 2019/0179335 | A1 | 6/2019 | Cha et al. | |
| 2022/0126917 | A1 * | 4/2022 | Helfrich | B62D 6/008 |

FOREIGN PATENT DOCUMENTS

| | | | |
|---|---|---|---|
| EP | 3858689 | A1 | 8/2021 |
| WO | 2013086517 | A1 | 6/2013 |

OTHER PUBLICATIONS

International Preliminary Report on Patentability for PCT Application No. PCT/EP2022/081888 dated Jun. 27, 2024, 15 pages.

* cited by examiner

VEHICLE STATUS EVALUATION

CROSS REFERENCE TO RELATED APPLICATION

This application is a 35 U.S.C. § 371 national stage application of PCT International Application No. PCT/EP2022/081888 filed on Nov. 15, 2022, the disclosure and content of which is incorporated by reference herein in its entirety.

TECHNICAL FIELD

The disclosure relates generally to vehicle control. In particular aspects, the disclosure relates to vehicle status evaluation in relation to the order of vehicle units and/or the order of wheel axles. The disclosure can be applied in heavy-duty vehicles, such as trucks, buses, and construction equipment. Although the disclosure may be described with respect to a particular vehicle, the disclosure is not restricted to any particular vehicle.

BACKGROUND

Vehicle control generally includes any approach to operating a vehicle. Vehicle operation may comprise interaction-through user interface devices-between a human operator and control systems of the vehicle. Alternatively or additionally, vehicle operation may comprise autonomous, or semi-autonomous, operation.

A dynamic model of the vehicle (e.g., including a kinematic model of the vehicle) may be applied for vehicle control; e.g., for vehicle motion management. Having an accurate dynamic model of the vehicle typically improves the control of the vehicle. In scenarios where the vehicle status is—at least partially—unknown and/or dynamically changing, the dynamic model of the vehicle may be inaccurate.

Therefore, there is a need for approaches to obtain information regarding the vehicle status.

DE 10 2007 040 165 A1 describes a method for operating a vehicle association, wherein the order of the vehicles can be determined.

SUMMARY

Various aspects may aim to solve or mitigate, alleviate, or eliminate at least some of the above or other disadvantages.

According to a first aspect of the disclosure, a computer-implemented method is provided for detection of order among vehicle units of a multi-unit combination vehicle. The method is for execution by a processor device of a computer system. The method comprises determining, by the processor device, at least two indications of order among the vehicle units, wherein the indications of order are determined by different procedures for detection of order among the vehicle units, and providing, by the processor device, the detection of order among the vehicle units based on the at least two indications of order.

The first aspect of the disclosure may seek to evaluate the status of the vehicle in relation to the order of vehicle units. A technical benefit may include that a dynamic model of the vehicle may be accurately determined. For example, when a vehicle unit is added to, or removed from the vehicle—or when a vehicle unit changes position within a vehicle train (e.g., platooning)—the dynamic model of the vehicle may track the dynamically changing situation. Having an accurate dynamic model of the vehicle typically improves the control of the vehicle. For example, the vehicle motion management may be improved.

A technical benefit of using at least two indications of order (e.g., based on more than one type of data source and/or using more than one method to deduce the order from collected data) may include improved accuracy.

In some examples, providing the detection of order comprises selecting an order that occurs most often among the indications of order. A technical benefit may include that the determined order is relatively likely to be correct.

In some examples, the procedures for detection of order are associated with respective weights, and providing the detection of order comprises determining a cumulative weight for each order that occurs among the indications of order and selecting an order that has the highest cumulative weight. A technical benefit may include that some procedures for detection of order may be prioritized over procedures for detection of order, which may increase accuracy. For example, procedures that generally detect order more accurately may be given higher weight than other procedures.

In some examples, one of the procedures for detection of order comprises indicating the order among the vehicle units based on respective timing of corresponding motion data from the vehicle units. A technical benefit may include that detection of the order among the vehicle units is facilitated by utilization of otherwise available information.

In some examples, a second vehicle unit is indicated as occurring after a first vehicle unit in the order responsive to a timing delay between motion data from the first vehicle unit and corresponding motion data from the second vehicle unit.

In some examples, the motion data from a vehicle unit pertains to one or more of: lateral acceleration of the vehicle unit, lateral retardation of the vehicle unit, longitudinal acceleration of the vehicle unit, longitudinal retardation of the vehicle unit, yaw rate of the vehicle unit, and articulation angle of the vehicle unit in relation to another-preceding or subsequent-vehicle unit. A technical benefit may include that detection of the order among the vehicle units is facilitated by utilization of otherwise available information. Another technical benefit may include that motion data for a vehicle unit can be collected from more than one type of data source, which typically improves accuracy and/or robustness. For example, motion data from two or more types of sources may be combined. Alternatively or additionally, motion data from a second type of source may provide redundancy when a first type of source fails to provide motion data.

In some examples, one of the procedures for detection of order comprises indicating the order among the vehicle units based on environmental data captured by respective sensors mounted on the vehicle units. A technical benefit may include that detection of the order among the vehicle units is facilitated by utilization of otherwise available information.

In some examples, a second vehicle unit is indicated as occurring after a first vehicle unit in the order responsive to a timing delay between occurrence of an event in the environmental data from the first vehicle unit and occurrence of the event in the environmental data from the second vehicle unit. A technical benefit may include that environmental information (e.g., optical information of the environment of the vehicle) is utilized, which may improve the accuracy of the order determination.

In some examples, a second vehicle unit is indicated as occurring after a first vehicle unit in the order responsive to detection of an identifier of the first vehicle unit by a forward-facing sensor of the second vehicle unit, and/or wherein a first vehicle unit is indicated as occurring before a second vehicle unit in the order responsive to detection of an identifier of the second vehicle unit by a backward-facing sensor of the first vehicle unit. A technical benefit may include that optical information is utilized—in relation to a specific vehicle unit—to identify a preceding or succeeding vehicle unit, which may improve the accuracy of the order determination.

In some examples, one of the procedures for detection of order comprises indicating the order among the vehicle units based on coupling data of communication wires between the vehicle units. A technical benefit may include that hardware information is utilized—in relation to a specific vehicle unit—to identify a preceding or succeeding vehicle unit, which may improve the accuracy of the order determination.

In some examples, a second vehicle unit is indicated as occurring after a first vehicle unit in the order responsive to the coupling data of a communication wire between the first and second vehicle units indicating the first vehicle unit as leading unit and/or indicating the second vehicle unit as following unit.

In some examples, the method comprises determining, by the processor device, a dynamic model of the vehicle based on the detected order among the vehicle units.

According to a second aspect of the disclosure, a computer program product is provided. The computer program product comprises program code for performing, when executed by the processor device, the method of the first aspect.

The second aspect of the disclosure may seek to convey program code for evaluation of the status of the vehicle in relation to the order of vehicle units. A technical benefit may include that new vehicles and/or legacy vehicles may be conveniently configured, by software installation/update, to perform the order detection.

According to a third aspect of the disclosure, a non-transitory computer-readable storage medium is provided. The non-transitory computer-readable storage medium comprises instructions, which when executed by a processor device, cause the processor device to perform the method of the first aspect.

The third aspect of the disclosure may seek to convey program code for evaluation of the status of the vehicle in relation to the order of vehicle units. A technical benefit may include that new vehicles and/or legacy vehicles may be conveniently configured, by software installation/update, to perform the order detection.

According to a fourth aspect of the disclosure, an apparatus is provided for detection of order among vehicle units of a multi-unit combination vehicle. The apparatus comprises controlling circuitry configured to cause determination of at least two indications of order among the vehicle units, wherein the indications of order are determined by different procedures for detection of order among the vehicle units, and provision of the detection of order among the vehicle units based on the at least two indications of order.

The fourth aspect of the disclosure may seek to provide a device for evaluation of the status of the vehicle in relation to the order of vehicle units. A technical benefit may include that new vehicles and/or legacy vehicles may be conveniently configured, by installation of the apparatus in the vehicle, to perform the order detection.

In some examples, the controlling circuitry may comprise a determiner configured to determine the at least two indications of order among the vehicle units, and a provisioner configured to provide the detection of order among the vehicle units based on the at least two indications of order.

According to a fifth aspect of the disclosure, a control system is provided, which comprises the apparatus of the fourth aspect. The control system is configured to individually control vehicle units of a multi-unit combination vehicle via a dynamic model of the vehicle, which is based on the detected order among the vehicle units.

The fifth aspect of the disclosure may seek to provide a system for improved vehicle control.

According to a sixth aspect of the disclosure, a control system is provided, which comprises one or more control units configured to perform the method of the first aspect.

The sixth aspect of the disclosure may seek to provide a system for evaluation of the status of the vehicle in relation to the order of vehicle units. A technical benefit may include that a dynamic model of the vehicle may be accurately determined. Having an accurate dynamic model of the vehicle typically improves the control of the vehicle.

The control systems of the fifth and sixth aspects may be a same control system, or may be different control systems.

According to a seventh aspect of the disclosure, a computer system is provided, which comprises a processor device configured to determine at least two indications of order among vehicle units of a multi-unit combination vehicle, wherein the indications of order are determined by different procedures for detection of order among the vehicle units, and provide a detection of order among the vehicle units based on the at least two indications of order.

The seventh aspect of the disclosure may seek to provide a system for evaluation of the status of the vehicle in relation to the order of vehicle units. A technical benefit may include that a dynamic model of the vehicle may be accurately determined. Having an accurate dynamic model of the vehicle typically improves the control of the vehicle.

According to an eighth aspect of the disclosure, a vehicle unit is provided, which comprises one or more of: the apparatus of the fourth aspect, the control system of any of the fifth and sixth aspects, the computer system of the seventh aspect, and a processor device configured to perform the method of the first aspect.

The eighth aspect of the disclosure may seek to enable improved vehicle control.

According to a ninth aspect of the disclosure, a multi-unit combination vehicle is provided, which comprises one or more of: the vehicle unit of the eighth aspect, the apparatus of the fourth aspect, the control system of any of the fifth and sixth aspects, the computer system of the seventh aspect, and a processor device configured to perform the method of the first aspect.

The ninth aspect of the disclosure may seek to provide a vehicle configured for improved motion control.

In some examples, any of the above aspects may additionally have features and/or benefits identical with or corresponding to any of the various features and benefits as explained above for any of the other aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

Further aims, features and advantages will appear from the detailed description, with reference being made to the accompanying drawings.

The drawings are not necessarily to scale, emphasis instead being placed upon illustrating the examples.

Figure 1A:
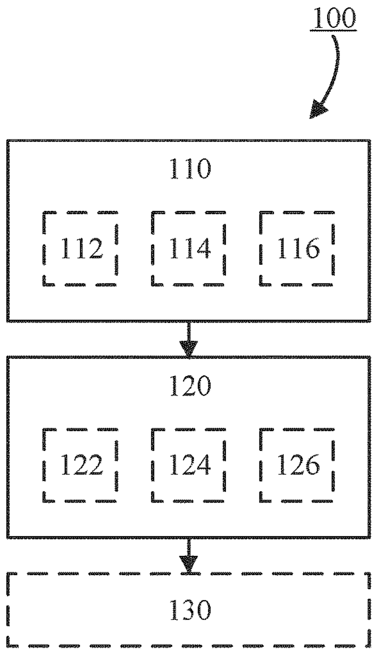

FIG. 1A is a flow chart of a method to detect order among vehicle units according to one example.

Figure 1B:
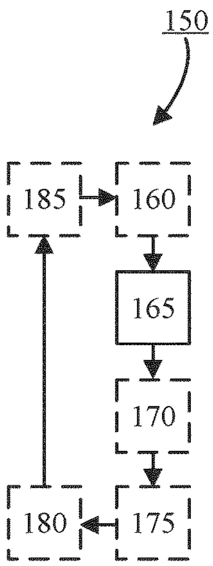

FIG. 1B is a flow chart of a method to detect order among wheel axles according to one example.

Figure 2:
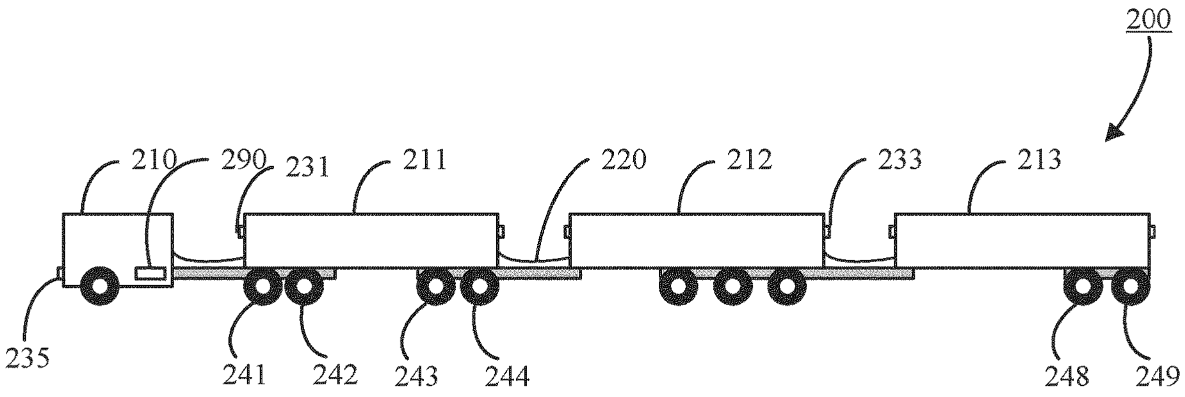

FIG. 2 is a schematic drawing of a vehicle according to one example.

Figure 3:
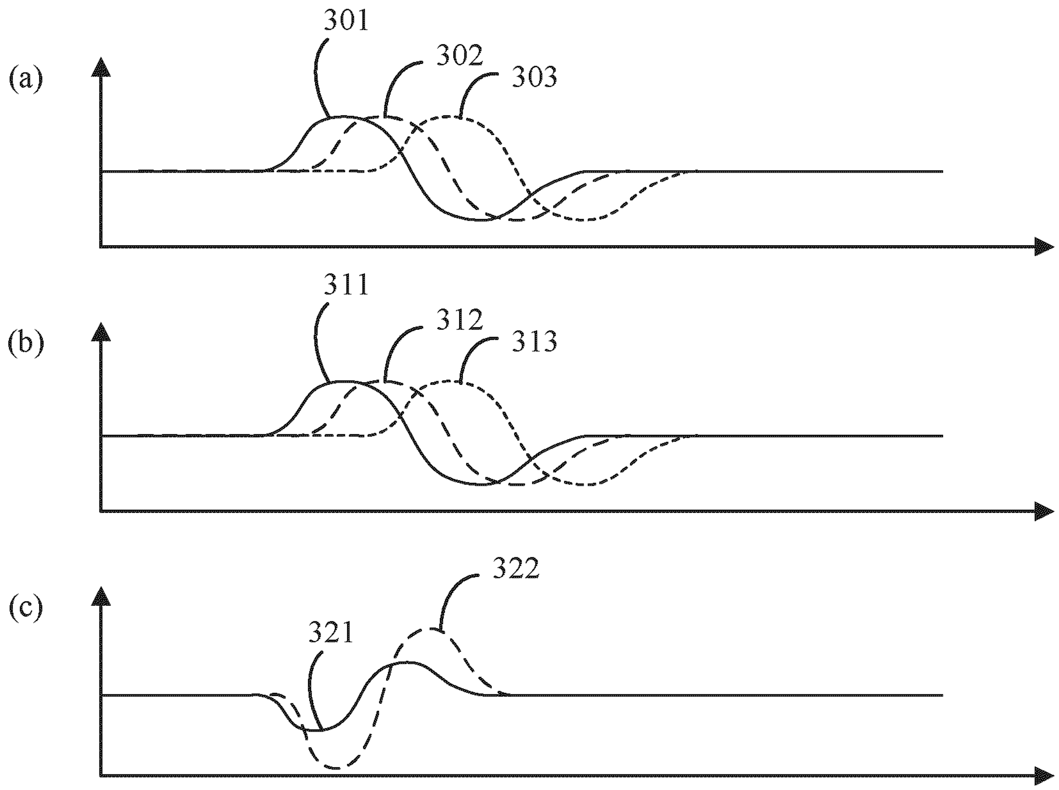

FIG. 3 is a collection of schematic plots of motion data relating to different vehicle units according to one example.

Figure 4:
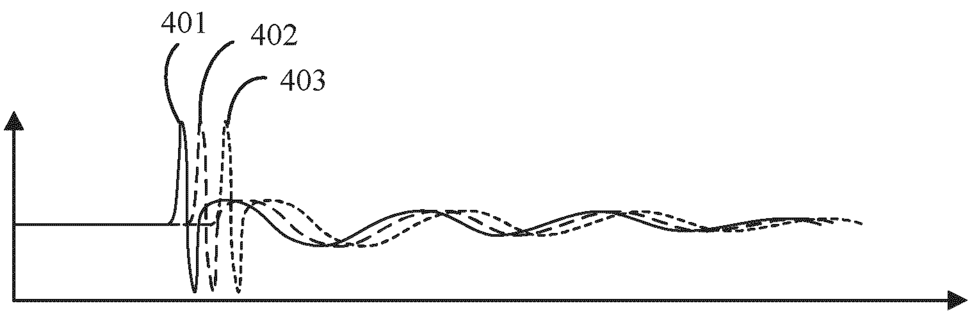

FIG. 4 is a schematic plot of vertical motion data relating to different wheel axles according to one example.

Figure 5:
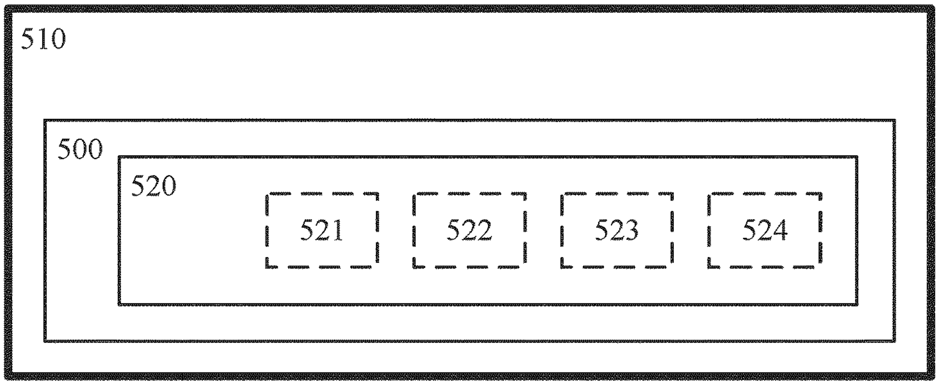

FIG. 5 is a schematic block diagram of an apparatus according to one example.

Figure 6:
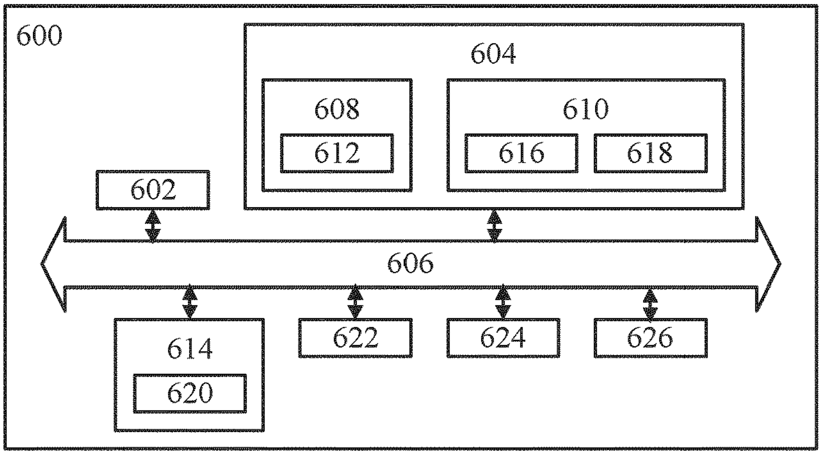

FIG. 6 is a schematic diagram of a computer system according to one example.

Figure 7:
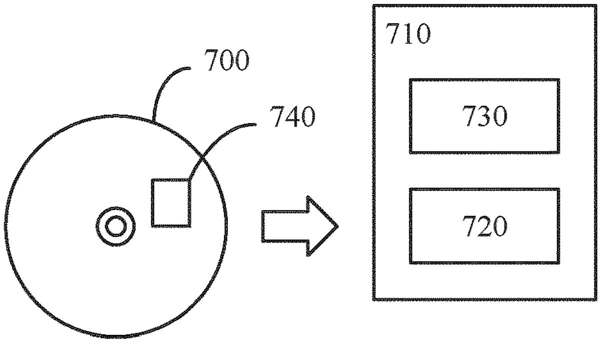

FIG. 7 is a schematic drawing of a computer readable medium according to one example.

Figure 8:
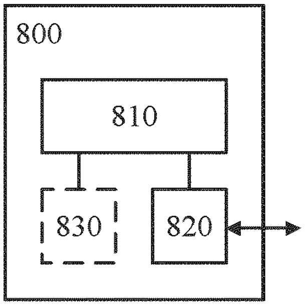

FIG. 8 is a schematic block diagram of a control unit according to one example.

DETAILED DESCRIPTION

Aspects set forth below represent the necessary information to enable those skilled in the art to practice the disclosure.

Examples of the present disclosure will be described more fully hereinafter with reference to the accompanying drawings. The solutions disclosed herein can, however, be realized in many different forms and should not be construed as being limited to the examples set forth herein.

In various situations, it may be beneficial to have information regarding the current status of the vehicle, which is as accurate as possible. For example, accurate vehicle status may be used to determine an accurate dynamic model of the vehicle, which may be applied for vehicle motion management and/or other types of vehicle control.

A dynamic model as referred to herein may comprise any suitable vehicle model; e.g., including two dimensional forces for each wheel, torque for each wheel, coupling forces, angles between vehicle units, etc.

This disclosure focuses on evaluation of the vehicle status in relation to the order of vehicle units and/or in relation to the order of wheel axles. This may be an important aspect of the vehicle status; especially when the situation in these regards is dynamically changing.

In some scenarios, vehicle units may be connected/de-connected/re-ordered automatically, leading to that the order of vehicle units changes dynamically. Thus, the number of vehicle units and/or their order may not be directly known. A first such example scenario is a logistics scenario, wherein loading/off-loading stops include automatic connection/de-connection of one or more vehicle unit. A second such example scenario is a dynamic traffic scenario, wherein autonomous vehicles may temporarily act as vehicle units in a train of vehicles (e.g., for traffic efficiency on a highway). In the second scenario, an autonomous vehicle may be dynamically inserted or appended to the train (e.g., in association with entering the highway via an entry ramp) and/or dynamically removed from the train (e.g., in association with exiting the highway via an exit ramp).

In some scenarios, wheel axles may be raised and/or lowered, either automatically or in response to an operator control input, leading to that the order of wheel axles changes dynamically. The raising/lowering of wheel axles may be at standstill or while the vehicle is in motion, as suitable. A first such example scenario is a logistics scenario, wherein loading/off-loading stops include adjustment of the selection of used wheel axles (e.g., depending on the weight and distribution of cargo). A second such example scenario is a traffic scenario, wherein dynamic evaluation of the driving conditions (e.g., state of the road, experienced grip, weather conditions, etc.) is used for adjustment of the selection of used wheel axles.

It should be understood that, even though the vehicle status information (order of vehicle units and/or order of wheel axles) is elaborated on herein in the context of determining an accurate dynamic model of the vehicle, other applications for the vehicle status information is not intended to be excluded.

For example, the order of vehicle units and/or order of wheel axles may be presented via a rendering unit of the vehicle; e.g., to provide an operator of the vehicle with continuous guidance for vehicle control.

Alternatively or additionally, the order of vehicle units may be provided to a logistics controller (which may be comprised in the vehicle or may be located externally to the vehicle); e.g., for planning of routes and/or loading/offloading actions.

Yet alternatively or additionally, when the multi-unit vehicle comprises a train of vehicles which are not physically attached to each other, the order of vehicle units may be provided to a traffic controller (which may be comprised in the vehicle or may be located externally to the vehicle); e.g., for planning of attach/release/reorder actions in relation to the vehicle units of the vehicle train.

Yet alternatively or additionally, the order of vehicle units may be used in relation to inputs from road map data that are position dependent; e.g., road curvature, road slope, road friction, etc. For example, which road map data slope to apply for a vehicle unit may depend on the position of the vehicle unit in a multi-unit combination vehicle; a slope which is currently valid for a first vehicle unit, may not yet be valid for a second-subsequent-vehicle unit.

Generally, a vehicle unit may refer to any suitable vehicle unit. For example, a vehicle unit may be a tractor unit or any type of trailer unit of a heavy-duty vehicle. A multi-unit combination vehicle generally comprises two or more vehicle units.

Also generally, the vehicle units of a multi-unit combination vehicle may be physically attached to each other, or may be associated with each other via virtual attachment (e.g., wireless communication) as exemplified by a train of vehicles.

FIG. 1A illustrates an example method 100 for detection (determination) of order among vehicle units of a multi-unit combination vehicle; e.g., for automatic detection of order among vehicle units.

The method 100 may be a computer-implemented method, for execution by a processor device of a computer system. Typically, the processor device is mounted/mountable in one of the vehicle units; e.g., the tractor unit. However, it should be understood that the processor device may be external to the vehicle in some scenarios. For example, the processor device may be comprised in a server node; e.g., as part of a wireless communication network, a cloud computing network, an autonomous drive control network, or similar.

The method 100 comprises determining, by the processor device, at least two indications of order among the vehicle units, as illustrated by step 110. The indications of order are determined by different procedures for detection (determination) of order among the vehicle units, as exemplified by optional sub-steps 112, 114, 116.

One of the procedures for detection of order may comprise indicating the order among the vehicle units based on respective timing of corresponding motion data from the vehicle units. This is represented by optional sub-step 112, which comprises determining the order among the vehicle units based on respective timing of corresponding motion data from the vehicle units. The method 100 may also comprise obtaining the motion data; e.g., receiving the motion data from one or more sensors of the respective vehicle units.

For example, by analyzing yaw rate and/or lateral acceleration and/or articulation angles during steering (e.g., steering of a tractor unit and one or more trailer unit(s)), and comparing the result between vehicle units, the relative timing of corresponding events may be seen as an indication of the order among vehicle units.

Alternatively or additionally, by analyzing longitudinal acceleration and/or speed during vehicle acceleration (e.g., starting from standstill, increasing speed, decreasing speed, braking, etc.), and comparing the result between vehicle units, the relative timing of corresponding events may be seen as an indication of the order among vehicle units. There is typically a delay between corresponding events for different vehicle units in relation to longitudinal motion; e.g., due to backlash effects in couplings, etc.

Typically, the determination in 112 may be based on timing of distinguishable events of the motion data (e.g., a distinct change in the motion data, such as an acceleration event). For example, when a distinguishable event occurs earlier in time for a first vehicle unit than for a second vehicle unit, it may be determined that the second vehicle unit occurs after the first vehicle unit in the order of vehicle units. Thus, a second vehicle unit may be indicated as occurring after a first vehicle unit in the order, responsive to a timing delay between motion data from the first vehicle unit and corresponding motion data from the second vehicle unit.

One or more type of motion data may be considered in 112. Typically, the timing is compared for the same type of motion data in relation to the different vehicle units.

Some examples of motion data include longitudinal motion (e.g., longitudinal speed and/or longitudinal acceleration/retardation), lateral motion (e.g., lateral acceleration/retardation), yaw rate, articulation angle (e.g., in relation to another-preceding or subsequent-vehicle unit), other steering motion, and vertical motion (e.g., vertical acceleration and/or vertical load).

When several different types of motion data are considered in 112, the result may be a corresponding amount of different indications of order among the vehicle units (i.e., one indication of order per type of motion data), or one or more the different types of motion data may be combined to determine a single indication of order among the vehicle units.

One of the procedures for detection of order may comprise indicating the order among the vehicle units based on environmental data captured by respective environmental sensors (e.g., camera, visual sensor, radar, lidar, distance detector, etc.) mounted on the vehicle units. This is represented by optional sub-step 114, which comprises determining the order among the vehicle units based on environmental data. The method 100 may also comprise obtaining the environmental data; e.g., receiving the environmental data from sensors of the respective vehicle units. Generally, environmental data may include information from the vehicle and/or its surroundings.

Typically, the determination in 114 may be based on timing of distinguishable events of the environmental data (e.g., clearly distinguishable object in the environmental data, such as image identification of a traffic sign). For example, when a distinguishable event occurs earlier in time for a sensor of a first vehicle unit than for a sensor of a second vehicle unit, it may be determined that the second vehicle unit occurs after the first vehicle unit in the order of vehicle units. Thus, a second vehicle unit may be indicated as occurring after a first vehicle unit in the order, responsive to a timing delay between occurrence of an event in the environmental data from the first vehicle unit and occurrence of the event in the environmental data from the second vehicle unit.

Alternatively or additionally, the determination in 114 may be based on distinguishable identifiers on the vehicle units (e.g., a visually distinguishable identifier; such as an EAN-code, a QR-code, a registration number, or an identification number printed/mounted on the vehicle unit). Generally, an identifier on a vehicle unit may be regarded as an example of environmental data. When the identifier is distinguishable from behind a vehicle unit, a forward-facing sensor of the subsequent unit can detect it, and when the identifier is distinguishable from being in front of a vehicle unit, a backward-facing sensor of the preceding unit can detect it. Thus, a second vehicle unit may be indicated as occurring after a first vehicle unit in the order responsive to detection of an identifier of the first vehicle unit by a forward-facing sensor of the second vehicle unit. Alternatively or additionally, a first vehicle unit may be indicated as occurring before a second vehicle unit in the order responsive to detection of an identifier of the second vehicle unit by a backward-facing sensor of the first vehicle unit.

Similarly to what has been discussed for the motion data in 112, one or more type of environmental data may be considered in 114. Typically, the timing is compared for the same type of environmental data in relation to the different vehicle units.

One of the procedures for detection of order may comprise indicating the order among the vehicle units based on coupling data of communication wires (e.g., a Controller Area Network, CAN, bus) between the vehicle units. This is represented by optional sub-step 116, which comprises determining the order among the vehicle units based on coupling data. The method 100 may also comprise obtaining the coupling data; e.g., receiving the coupling data from communication wire coupling ports of the respective vehicle units.

Typically, the determination in 116 may be based on knowledge regarding which end of a communication wire is connected to a leading unit and which end of a communication wire is connected to a following unit; e.g., for communication wires that are not reversibly connectable between vehicle units. For example, a second vehicle unit may be indicated as occurring after a first vehicle unit in the order responsive to the coupling data of a communication wire between the first and second vehicle units indicating the first vehicle unit as leading unit and/or indicating the second vehicle unit as following unit.

Alternatively or additionally, the determination in 116 may be based on timing of communication signals (e.g., control signals) propagating through the multi-unit vehicle. For example, since a control signal from the tractor reaches a first trailer before it reaches a subsequent trailer, signal detection reports from the trailers may be used to determine the order. A similar approach may be used for determining the order based on timing of communication signals conveyed from a trailer to the tractor.

It should be noted that performance of step 110 may be extended over time. For example, a distinguishable motion data even may not occur at the same time as a distinguishable environmental data event, a distinguishable vertical motion data event may not occur at the same time as a distinguishable longitudinal motion data event, etc. Thus, the at least two indications of order may be determined at different times and/or based on data received at different times.

The method 100 also comprises providing, by the processor device, the detection of order among the vehicle units (determining, by the processor device, the order among the vehicle units) based on the at least two indications of order, as illustrated by step 120. In some examples the vehicle unit are assigned respective numbers corresponding to the detected order.

The detection of order may be based on the at least two indications of order in any suitable way.

For example, the order that occurs most often among the indications of order may be selected to represent the order among the vehicle units; i.e., a majority vote approach may be applied. This is illustrated by optional sub-step 122, which comprises selecting an order that occurs most often among the indications of order. To exemplify, when three indications of order are used and they indicate vehicle unit orders as A-B-C, B-A-C, and B-A-C, respectively, the order may be provided as B-A-C.

Alternatively, the procedures for detection of order are associated with respective weights; e.g., representing different priorities. Then, a cumulative weight may be determined for each order that occurs among the indications, and the order that has the highest cumulative weight may be selected to represent the order among the vehicle units. This is illustrated by optional sub-steps 124, 126, which comprises-respectively-determining a cumulative weight for each order that occurs among the indications of order, and selecting an order that has the highest cumulative weight. To exemplify, when three indications of order are used with respective weights equal to “3”, “1”, and “1”, and they indicate vehicle unit orders as A-B-C, B-A-C, and B-A-C, respectively, the order may be provided as A-B-C (since A-B-C has cumulative weight “3” while B-A-C has cumulative weight “1"+” 1").

The weighted approach enables prioritizing among the procedures for detection of order. For example, a particularly reliable/accurate procedure may be given higher weight than other procedures.

The weights may be pre-determined, or may be dynamically variable. For example, the weight of a back-up procedure may be set to zero when any other procedure generates a result, and may be set to a non-zero value when no other procedure generates a result.

More generally, the weight for one or more procedure may be dynamically set to zero; depending on the result of at least two procedures for detection of order. Thus, based on some condition involving the result of at least two procedures for detection of order, the result of a single one of the at least two procedures may be selected.

The method 100 may also comprise determining, by the processor device, a dynamic model of the vehicle based on the detected order among the vehicle units, as illustrated by step 130. The dynamic model of the vehicle may be used for vehicle control; e.g., for vehicle motion management on vehicle unit level.

In some examples, the method 100 is performed repeatedly. Thus, the order among the vehicle units may be repeatedly determined, and an update of the detected order may be provided in response thereto (e.g., for each order determination, or only when the detected order changes).

For example, the method 100 may be performed at pre-determined or dynamically changing time intervals. Alternatively or additionally, the method 100 may be performed responsive to a triggering event. Example events that may be used to trigger the method 100 to be performed include detection of addition/removal/change of a physical/virtual vehicle unit attachment, detection of inferior performance of the vehicle motion management, initiation of vehicle movement after a vehicle stop, completion of a loading/off-loading stop in a logistics scenario, reception of input which is useful for order determination (e.g., a distinguishable motion/environmental data event), etc.

For repeating execution of the method 100, step 110 may comprise determining only one indication of order among the vehicle units, and an indication of order determined earlier by a different procedure for detection of order may be used to provide the at least two indications of order among the vehicle units.

The method 100 evaluates the status of the vehicle in relation to the order of vehicle units. A dynamic model of the vehicle may be determined accordingly, which may be used for control of the vehicle. Using at least two indications of order typically improves accuracy and/or robustness and/or reliability of the order determination (compared to using only one indications of order). The corresponding improvement of the dynamic model typically entails improved vehicle safety during operation.

FIG. 1B illustrates an example method 150 for detection (determination) of order among wheel axles of a vehicle; e.g., for automatic detection of order among wheel axles. The method may be applied to a single-unit vehicle, as well as to e multi-unit combination vehicle.

The method 150 may be a computer-implemented method, for execution by a processor device of a computer system. Typically, the processor device is mounted/mountable in the vehicle; e.g., in one of the vehicle units for a multi-unit combination vehicle. However, it should be understood that the processor device may be external to the vehicle in some scenarios. For example, the processor device may be comprised in a server node; e.g., as part of a wireless communication network, a cloud computing network, an autonomous drive control network, or similar.

The method 150 comprises providing, by the processor device, the detection of order among the wheel axles (determining, by the processor device, the order among the wheel axles) based on respective timing of corresponding vertical motion data from the wheel axles, as illustrated by step 165. In some examples the wheel axles are assigned respective numbers corresponding to the detected order. The method 150 may also comprise obtaining the vertical motion data; e.g., receiving the vertical motion data from one or more sensors of the vehicle.

Some examples of vertical motion data include vertical acceleration, vertical load, vertical pressure, vertical force, vertical distance to ground, etc. A change in any if these metrics may be interpreted as an expression of vertical motion. For example, when climbing a bump, the vertical load and/or the vertical pressure may have a value which is higher than the nominal value experienced before the bump, and the value may be lower than the nominal value experienced before the bump when descending.

The vertical motion data may be obtained in any suitable way. For example, the vertical motion data from a wheel axle may pertain to one or more of: pressure sensor data of the wheel axles, vertical accelerometer data of the wheel axles, suspension data of the wheel axles, and distance sensor data of the wheel axles. Additionally or alternatively, the vertical motion data from a wheel axle may pertain to vertical motion of the wheel axle and/or vertical motion of one or more joint associated with the wheel axle.

Typically, the determination of order among wheel axles in 165 may be based on timing of distinguishable events of the vertical motion data (e.g., a distinct change in the vertical motion data, such as a vertical pressure event). For example, when a distinguishable event occurs earlier in time for a first wheel axle than for a second wheel axle, it may be determined that the second wheel axle occurs after the first wheel axle in the order of wheel axles. Thus, a second wheel axle may be indicated as occurring after a first wheel axle in the order, responsive to a timing delay between vertical motion data from the first wheel axle and corresponding vertical motion data from the second wheel axle. Alternatively or additionally, when a distinguishable event occurs for a first wheel axle but not for a second wheel axle, it may be determined that the second wheel axle is raised and is not included in the order among wheel axles.

Distinguishable events of the vertical motion data may occur, for example, responsive to passing uneven portions of a road. Example uneven portions of a road include a speed bump or other bump of the road, a pothole or other depression of the road, an obstacle on the road, and a road joint (e.g., an expansion joint, a bridge joint, etc.).

In some examples, the method 150 may be performed responsive to a triggering event, as illustrated by optional step 160. Example events that may be used to trigger the method 150 to be performed include detection of addition/removal/change of a physical/virtual vehicle unit attachment, detection of inferior performance of the vehicle motion management, initiation of vehicle movement after a vehicle stop, completion of a loading/off-loading stop in a logistics scenario, reception of input which is useful for order determination (e.g., a distinguishable vertical motion data event), lowering/raising of a wheel axle of the vehicle, etc. Thus, the detection of order among wheel axles in 165 may be performed responsive to lowering or raising a wheel axle of the vehicle.

The method 150 may also comprise determining, by the processor device, an order among vehicle units of a multi-unit combination vehicle, as illustrated by optional step 170.

The order among vehicle units may be determined based on respective timing of corresponding vertical motion data from the wheel axles of the vehicle units; e.g., similarly to what has already been described for 112 of FIG. 1A. Thus, typically, the determination of order among vehicle units in 170 may be based on timing of distinguishable events of the vertical motion data. For example, when a distinguishable event occurs earlier in time for a first vehicle unit than for a second vehicle unit, it may be determined that the second vehicle unit occurs after the first vehicle unit in the order of vehicle units.

Alternatively or additionally, the order among vehicle units may be determined based on the detected order among wheel axles. For example, the detected order among wheel axles and information about which vehicle unit a wheel axle belongs to may be used to deduce the order among vehicle units.

In some examples, the method 150 may be combined with the method 100 of FIG. 1A such that step 170 is comprised in sub-step 112 of FIG. 1A.

The method 150 may also comprise determining, by the processor device, a dynamic model of the vehicle based on the detected order among the wheel axles and/or the detected order among vehicle units, as illustrated by step 175. The dynamic model of the vehicle may be used for vehicle control; e.g., for vehicle motion management on vehicle unit level. When the method 150 is combined with the method 100 of FIG. 1A, step 175 may be merged with step 130 of FIG. 1A.

In some examples, the method 150 comprises triggering, by the processor device, collection of vertical motion data, as illustrated by optional step 180. Triggering of collection of vertical motion data may coincide with triggering of detection of order among wheel axles, or they may be separately triggered. Thus, the collection of data may be triggered in 180 when there is an opportunity to collect useful data (e.g., when there is an upcoming speed bump), while the detection of order among wheel axles may be triggered in 160 at a later time (e.g., when enough data has been collected for reliable detection). The triggering in 180 may be responsive to identification, by a forward-facing sensor of the vehicle, of an upcoming road unevenness; e.g., a speed bump, a pothole, an obstacle on the road, or similar. Alternatively or additionally, collection of vertical motion data may be triggered based on road map data identifying upcoming road unevenness.

When the steering angle is relatively large, the vertical motion data may be unsuitable, or at least not optimal, for order detection. For example, during a turn, the different wheel axles may not follow the same path. Therefore, the different wheel axles may experience road unevenness differently, and corresponding vertical motion data may be misleading.

In some examples, this is addressed by only using vertical motion data, which is collected under conditions where a steering angle of the vehicle is smaller than a first steering angle threshold.

Alternatively or additionally, the method may comprise compensating, by the processor device, vertical motion data collected under conditions where a steering angle of the vehicle is larger than a second steering angle threshold, as illustrated by optional step 185. This is particularly helpful when there is a lack of vertical motion data for small steering angles (e.g., the only bump in a relatively long road portion occurs in a turn of the road). The compensation may comprise taking into account the fact that different wheel pairs may travel along quite different paths when the steering angle of the vehicle relatively large. For example, expectations regarding similarities of the vertical motion data profiles of different wheel pairs may be relaxed; e.g., since it cannot be expected that all wheel pairs traverse an unevenness of the road in the same manner when the steering angle of the vehicle relatively large. Alternatively or additionally, that a wheel pair does not exhibit vertical motion to the same extent as other wheel pairs (or at all) may not be directly regarded as an indication to conclude that that wheel axle is raised; e.g., since it cannot be expected that an unevenness of the road is traversed by all wheel pairs when the steering angle of the vehicle relatively large. Thus, vertical motion data might be used to determine an order among wheel axles that exhibit vertical motion when the steering angle of the vehicle relatively large, but conclusions regarding wheel axles being raised might be avoided (or at least regarded as less reliable).

The first and second steering angle threshold may have the same or different values.

The steering angle can be determined as the actual steering angle (i.e., retroactively to the collection of vertical motion data) or as a predicted steering angle (e.g., using a forward-facing sensor or map data). In the latter case, the steering angle may be used as a triggering condition for collection of vertical motion data in 180.

In some examples, the method 150 is performed repeatedly. Thus, the order among the wheel axles may be repeatedly detected/updated.

For example, the method 150 may be performed at pre-determined or dynamically changing time intervals. Alternatively or additionally, the method 150 may be performed responsive to a triggering event, as already discussed for 160.

The method 150 evaluates the status of the vehicle in relation to the order of wheel axles (and possibly also in relation to the order of vehicle units). A dynamic model of the vehicle may be determined accordingly, which may be used for control of the vehicle. Using vertical motion data typically improves accuracy and/or robustness and/or reliability of the order detection (compared to not using vertical motion information). The corresponding improvement of the dynamic model typically entails improved vehicle safety during operation.

Hence, according to some examples, the method 150 relates to measurements of dynamic normal loads per wheel axle (e.g., by means of pressure sensors, accelerometers, distance sensors, suspension compression/extension, or similar). Road unevenness may provide excitation for execution of the method 150, and it may be analyzed how a corresponding vertical event propagates through the vehicle wheel axles.

FIG. 2 is a schematic drawing of an example multi-unit combination vehicle 200 (e.g., for cargo transport), wherein the herein disclosed techniques can be applied. The vehicle 200 comprises a tractor unit 210 (e.g., truck or towing vehicle), which is configured to tow one or more trailer unit(s) 211, 212, 213.

The tractor unit 210 comprises a vehicle control unit (VCU) 290—or other computer system comprising a processor device—configured to perform various vehicle control functions, such as path following and vehicle motion management.

The VCU 290 may be configured to perform one or more method steps of the method 100 of FIG. 1A and/or of the method 150 of FIG. 1B. Thus, the order of vehicle units 210, 211, 212, 213 and/or the order of wheel axles 241, 242, 243, 244, 248, 249 may be detected for the vehicle 200 as already exemplified herein.

Although not shown, it should be understood that a VCU may be comprised—additionally or alternatively—in one or more of the trailer unit(s). Also alternatively or additionally, a control unit (e.g., a parametrized VCU) may be comprised in a remote server node to which the vehicle 200 may be connected via wireless link. Generally, approaches described herein (e.g., the method 100 of FIG. 1A and/or of the method 150 of FIG. 1B) may be performed by any VCU or other control unit; alone or in combination. For example, steps 110 and 120 of FIG. 1A may be performed by the VCU 290 and step 130 of FIG. 1A may be performed remotely (e.g., by cloud computing).

A forward-facing sensor 235 of the tractor unit 210 may be used to identify upcoming road unevenness (compare with 180 of FIG. 1B). Forward-facing sensors 231, 235 and/or backward-facing sensors 233 of the vehicle units may be used to capture environmental data and/or distinguish identifiers on preceding/succeeding vehicle units (compare with 114 of FIG. 1A).

Communication wires 220 between the vehicle units may provide coupling data (compare with 116 of FIG. 1A).

FIG. 3 schematically illustrates example motion data relating to different vehicle units in timing diagrams. The motion data of FIG. 3 may be applicable, for example, in 112 of FIG. 1A.

Plot (a) shows yaw rate over time for a tractor unit 301, a first trailer unit 302 and a second trailer unit 303. A distinguishable yaw rate event is distributed in time for the different units, which enables determination of the order among the vehicle units, as described herein.

Plot (b) shows lateral acceleration over time for a tractor unit 311, a first trailer unit 312 and a second trailer unit 313. A distinguishable lateral acceleration event is distributed in time for the different units, which enables determination of the order among the vehicle units, as described herein.

Plot (c) shows articulation angle over time between a tractor unit and a first trailer unit 321 and between the first trailer unit and a second trailer unit 322. A distinguishable articulation angle event is distributed in time for the different unit pairs, which enables determination of the order among the vehicle units, as described herein.

FIG. 4 schematically illustrates example vertical motion data relating to different wheel axles in timing diagrams. The vertical motion data of FIG. 4 may be applicable, for example, in 165 of FIG. 1B.

The plot shows dynamic load over time for three different wheel axles 401, 402, 403. A distinguishable dynamic load event is distributed in time for the different wheel axles, which enables determination of the order among the wheel axles, as described herein.

FIG. 5 schematically illustrates an example apparatus 500. The apparatus 500 is for detection of order among vehicle units of a multi-unit combination vehicle and/or for detection of order among wheel axles of a vehicle.

For example, the apparatus 500 may be comprised in a control system 510; e.g., a VCU. Alternatively or additionally, the apparatus 500 may be configured to perform (or cause performance of) one or more method steps of the method 100 of FIG. 1A and/or of the method 150 of FIG. 1B.

The apparatus 500 comprises a controller (e.g., controlling circuitry, control module, or control unit) 520. For example, the controller 520 may be, may comprise, or may be comprised in, a processor device.

The controller 520 may be configured to cause determination of at least two indications of order among the vehicle units, wherein the indications of order are determined by different procedures for detection of order among the vehicle units (compare with 110 of FIG. 1A and 170 of FIG. 1B).

To this end, the controller 520 may comprise one or more indication determiner (e.g., determining circuitry, determination module, or determination unit) 521. The indication determiner 521 may be configured to determine the indications of order (e.g., as described in connection with one or more of 112, 114, 116 of FIG. 1A).

Alternatively or additionally, the controller 520 may be configured to cause provision of the detection of order among the vehicle units (determination of order among the vehicle units) based on the at least two indications of order (compare with 120 of FIG. 1A and 170 of FIG. 1B).

To this end, the controller 520 may comprise a provisioner (e.g., providing circuitry, provision module, or provision unit) 522. The provisioner 522 may be configured to provide the detection of order among the vehicle units (e.g., as described in connection with one or more of 122, 124, 126 of FIG. 1A). The provisioner 522 may be seen as an order determiner, and may be configured to determine the order among the vehicle units based on the at least two indications of order.

Yet alternatively or additionally, the controller 520 may be configured to cause provision of the detection of order among the wheel axles (determination of order among the wheel axles) based on respective timing of corresponding vertical motion data from the wheel axles (compare with 165 of FIG. 1B).

To this end, the controller 520 may comprise a provisioner (e.g., providing circuitry, provision module, or provision unit) 523. The provisioner 523 may be configured to provide the detection of order among the wheel axles. The provisioner 523 may be seen as an order determiner, and may be configured to determine the order among the wheel axles.

The controller 520 may be further configured to cause determination of a dynamic model of the vehicle based on the detected order among the vehicle units and/or based on the detected order among the wheel axles (compare with 130 of FIG. 1A and 175 of FIG. 1B).

To this end, the controller 520 may comprise a model determiner (e.g., determining circuitry, determination module, or determination unit) 524. The model determiner 524 may be configured to determine the dynamic model of the vehicle.

FIG. 6 is a schematic diagram of a computer system 600 for implementing examples disclosed herein. The computer system 600 may be comprised—or comprisable—in a vehicle according to some examples.

For example, the computer system 600 may be configured to execute, or cause execution of, one or more of the method steps as described in connection with FIGS. 1A and 1B.

Alternatively or additionally, the computer system 600 may be configured to determine (e.g., by the processor device 602) at least two indications of order among vehicle units of a multi-unit combination vehicle, wherein the indications of order are determined by different procedures for detection of order among the vehicle units, and provide (e.g., by the processor device 602) a detection of order among the vehicle units based on the at least two indications of order.

Yet alternatively or additionally, the computer system 600 may be configured to provide (e.g., by the processor device 602) a detection of order among wheel axles of a vehicle based on respective timing of corresponding vertical motion data from the wheel axles.

The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be implemented in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The described examples and their equivalents may be realized in software or hardware or a combination thereof. The examples may be performed by general purpose circuitry. Examples of general purpose circuitry include digital signal processors (DSP), central processing units (CPU), co-processor units, field programmable gate arrays (FPGA) and other programmable hardware. Alternatively or additionally, the examples may be performed by specialized circuitry, such as application specific integrated circuits (ASIC). The general purpose circuitry and/or the specialized circuitry may, for example, be associated with or comprised in an electronic apparatus such as a vehicle control unit.

The electronic apparatus may comprise arrangements, circuitry, and/or logic according to any of the examples described herein. Alternatively or additionally, the electronic apparatus may be configured to perform method steps according to any of the examples described herein.

According to some examples, a computer program product comprises a non-transitory computer readable medium such as, for example, a universal serial bus (USB) memory, a plug-in card, an embedded drive, or a read only memory (ROM). FIG. 7 illustrates an example computer readable medium in the form of a compact disc (CD) ROM 700. The computer readable medium has stored thereon a computer program 740 comprising program instructions. The computer program is loadable into a data processor (e.g., a data processing unit) 720, which may, for example, be comprised in a vehicle control unit 710. When loaded into the data processor, the computer program may be stored in a memory 730 associated with, or comprised in, the data processor. According to some examples, the computer program may, when loaded into, and run by, the data processor, cause execution of method steps according to, for example, any of the methods described herein.

FIG. 8 schematically illustrates, in terms of a number of functional units, the components of a control unit 800 according to some examples. The control unit may be comprised in a vehicle, e.g., in the form of a vehicle motion management (VMM) unit. A processor device in the form of processing circuitry 810 is provided using any combination of one or more of a suitable central processing unit (CPU), multiprocessor, microcontroller, digital signal processor (DSP), or similar; capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 800 to perform a set of operations, or steps; for example, any one or more of the methods discussed in connection to FIG. 1A and FIG. 1B.

For example, the storage medium 830 may store a set of operations, and the processing circuitry 810 may be configured to retrieve the set of operations from the storage medium 830 to cause the control unit 800 to perform the set of operations. The set of operations may be provided as a set of executable instructions. Thus, the processing circuitry 810 is thereby arranged to execute methods as herein disclosed.

The storage medium 830 may comprise persistent storage, which, for example, can be any single one or combination of magnetic memory, optical memory, solid state memory or even remotely mounted memory.

The control unit 800 may further comprise an interface 820 for communication with at least one external device. As such, the interface 820 may comprise one or more transmitters and receivers, comprising analogue and digital components and a suitable number of ports for wireline or wireless communication.

The processing circuitry 810 controls the general operation of the control unit 800, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

In some examples, the control unit 800 may be seen as a control system, or may be comprised in a control system. Such a control system may, for example, comprise the apparatus 500 as described in connection with FIG. 5 (e.g., the processing circuitry 810 may comprise the controller 520 of FIG. 5).

The control system may be configured for vehicle motion management (VMM). In some examples, the control system is configured to individually control vehicle units and/or vehicle axles and/or wheels of a multi-unit combination vehicle via a dynamic model of the vehicle, which is based on a detected order among vehicle units and/or a detected order among wheel axles.

For example, the VCU 290 of FIG. 2 may comprise one or more of the apparatus 500 of FIG. 5, the control system 510 of FIG. 5, the computer system 600 of FIG. 6, the vehicle control unit 710 of FIG. 7, and the control unit 800 of FIG. 8.

It should be noted that a feature or advantage mentioned herein in relation to one of the figures may be equally applicable, as suitable, to any other one of the figures; even if not mentioned explicitly in relation thereto.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the figures. It will be understood that these terms and those discussed above are intended to encompass different orientations of the device in addition to the orientation depicted in the figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Reference has been made herein to various examples. However, a person skilled in the art would recognize numerous variations to the described examples that would still fall within the scope of the claims.

For example, the methods described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the examples disclosed herein may be applied to any other example, wherever suitable. Likewise, any advantage of any of the examples may apply to any other examples.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method for detection of order among vehicle units of a multi-unit combination vehicle, for execution by a processor device of a computer system, the method comprising:

determining, by the processor device, at least two indications of order among the vehicle units, wherein the indications of order are determined by different procedures for detection of order among the vehicle units, wherein the procedures for detection of order are associated with respective weights; and providing, by the processor device, the detection of order among the vehicle units based on the at least two indications of order, wherein providing the detection of order comprises:

determining a cumulative weight for each order that occurs among the indications of order; and selecting an order that has the highest cumulative weight, wherein one of the procedures for detection of order comprises indicating the order among the vehicle units based on respective timing of corresponding motion data from the vehicle units, and wherein a second vehicle unit is indicated as occurring after a first vehicle unit in the order responsive to a timing delay between motion data from the first vehicle unit and corresponding motion data from the second vehicle unit.

2. The method of claim 1, wherein the motion data from a vehicle unit pertains to one or more of: lateral acceleration of the vehicle unit, lateral retardation of the vehicle unit, longitudinal acceleration of the vehicle unit, longitudinal retardation of the vehicle unit, yaw rate of the vehicle unit, and articulation angle of the vehicle unit in relation to another—preceding or subsequent—vehicle unit.

3. The method of claim 1, wherein one of the procedures for detection of order comprises indicating the order among the vehicle units based on environmental data captured by respective sensors mounted on the vehicle units.

4. The method of claim 3, wherein a second vehicle unit is indicated as occurring after a first vehicle unit in the order responsive to a timing delay between occurrence of an event in the environmental data from the first vehicle unit and occurrence of the event in the environmental data from the second vehicle unit.

5. The method of claim 3, wherein a second vehicle unit is indicated as occurring after a first vehicle unit in the order responsive to detection of an identifier of the first vehicle unit by a forward-facing sensor of the second vehicle unit, and/or wherein a first vehicle unit is indicated as occurring before a second vehicle unit in the order responsive to detection of an identifier of the second vehicle unit by a backward-facing sensor of the first vehicle unit.

6. The method of claim 1, wherein one of the procedures for detection of order comprises indicating the order among the vehicle units based on coupling data of communication wires between the vehicle units.

7. The method of claim 6, wherein a second vehicle unit is indicated as occurring after a first vehicle unit in the order responsive to the coupling data of a communication wire between the first and second vehicle units indicating the first vehicle unit as leading unit and/or indicating the second vehicle unit as following unit.

8. The method of claim 1, further comprising determining, by the processor device, a dynamic model of the vehicle based on the detected order among the vehicle units.

9. A computer program product comprising program code for performing, when executed by the processor device, the method of claim 1.

10. A non-transitory computer-readable storage medium comprising instructions, which when executed by the processor device, cause the processor device to perform the method of claim 1.

11. An apparatus for detection of order among vehicle units of a multi-unit combination vehicle, the apparatus comprising controlling circuitry configured to cause:

determination of at least two indications of order among the vehicle units, wherein the indications of order are determined by different procedures for detection of order among the vehicle units, wherein the procedures for detection of order are associated with respective weights; and provision of the detection of order among the vehicle units based on the at least two indications of order, wherein the provision of the detection of order comprises:

determination of a cumulative weight for each order that occurs among the indications of order; and selection of an order that has the highest cumulative weight, wherein one of the procedures for detection of order comprises indicating the order among the vehicle units based on respective timing of corresponding motion data from the vehicle units, and wherein a second vehicle unit is indicated as occurring after a first vehicle unit in the order responsive to a timing delay between motion data from the first vehicle unit and corresponding motion data from the second vehicle unit.

12. The apparatus of claim 11, wherein the controlling circuitry comprises:

a determiner configured to determine the at least two indications of order among the vehicle units; and a provisioner configured to provide the detection of order among the vehicle units based on the at least two indications of order.

13. A control system comprising the apparatus of claim 11, wherein the control system is configured to individually control vehicle units of a multi-unit combination vehicle via a dynamic model of the vehicle, which is based on the detected order among the vehicle units.

14. A computer system comprising a processor device configured to:

determine at least two indications of order among vehicle units of a multi-unit combination vehicle, wherein the indications of order are determined by different procedures for detection of order among the vehicle units, wherein the procedures for detection of order are associated with respective weights, and provide a detection of order among the vehicle units based on the at least two indications of order by determining a cumulative weight for each order that occurs among the indications of order and selecting an order that has the highest cumulative weight, wherein one of the procedures for detection of order comprises indicating the order among the vehicle units based on respective timing of corresponding motion data from the vehicle units, and wherein a second vehicle unit is indicated as occurring after a first vehicle unit in the order responsive to a timing delay between motion data from the first vehicle unit and corresponding motion data from the second vehicle unit.

15. A vehicle unit comprising the computer system of claim 14.

16. A multi-unit combination vehicle comprising the computer system of claim 14.

17. A computer-implemented method for detection of order among vehicle units of a multi-unit combination vehicle, for execution by a processor device of a computer system, the method comprising:

determining, by the processor device, at least two indications of order among the vehicle units, wherein the indications of order are determined by different procedures for detection of order among the vehicle units, wherein the procedures for detection of order are associated with respective weights; and providing, by the processor device, the detection of order among the vehicle units based on the at least two indications of order, wherein providing the detection of order comprises:

determining a cumulative weight for each order that occurs among the indications of order; and selecting an order that has the highest cumulative weight, wherein one of the procedures for detection of order comprises indicating the order among the vehicle units based on environmental data captured by respective sensors mounted on the vehicle units, and wherein a second vehicle unit is indicated as occurring after a first vehicle unit in the order responsive to detection of an identifier of the first vehicle unit by a forward-facing sensor of the second vehicle unit, and/or wherein a first vehicle unit is indicated as occurring before a second vehicle unit in the order responsive to detection of an identifier of the second vehicle unit by a backward-facing sensor of the first vehicle unit.

18. A computer system comprising a processor device configured to:

determine at least two indications of order among vehicle units of a multi-unit combination vehicle, wherein the indications of order are determined by different procedures for detection of order among the vehicle units, wherein the procedures for detection of order are associated with respective weights, and provide a detection of order among the vehicle units based on the at least two indications of order by determining a cumulative weight for each order that occurs among the indications of order and selecting an order that has the highest cumulative weight, wherein one of the procedures for detection of order comprises indicating the order among the vehicle units based on environmental data captured by respective sensors mounted on the vehicle units, and wherein a second vehicle unit is indicated as occurring after a first vehicle unit in the order responsive to detection of an identifier of the first vehicle unit by a forward-facing sensor of the second vehicle unit, and/or wherein a first vehicle unit is indicated as occurring before a second vehicle unit in the order responsive to detection of an identifier of the second vehicle unit by a backward-facing sensor of the first vehicle unit.

* * * * *